UNITED STATES PATENT OFFICE.

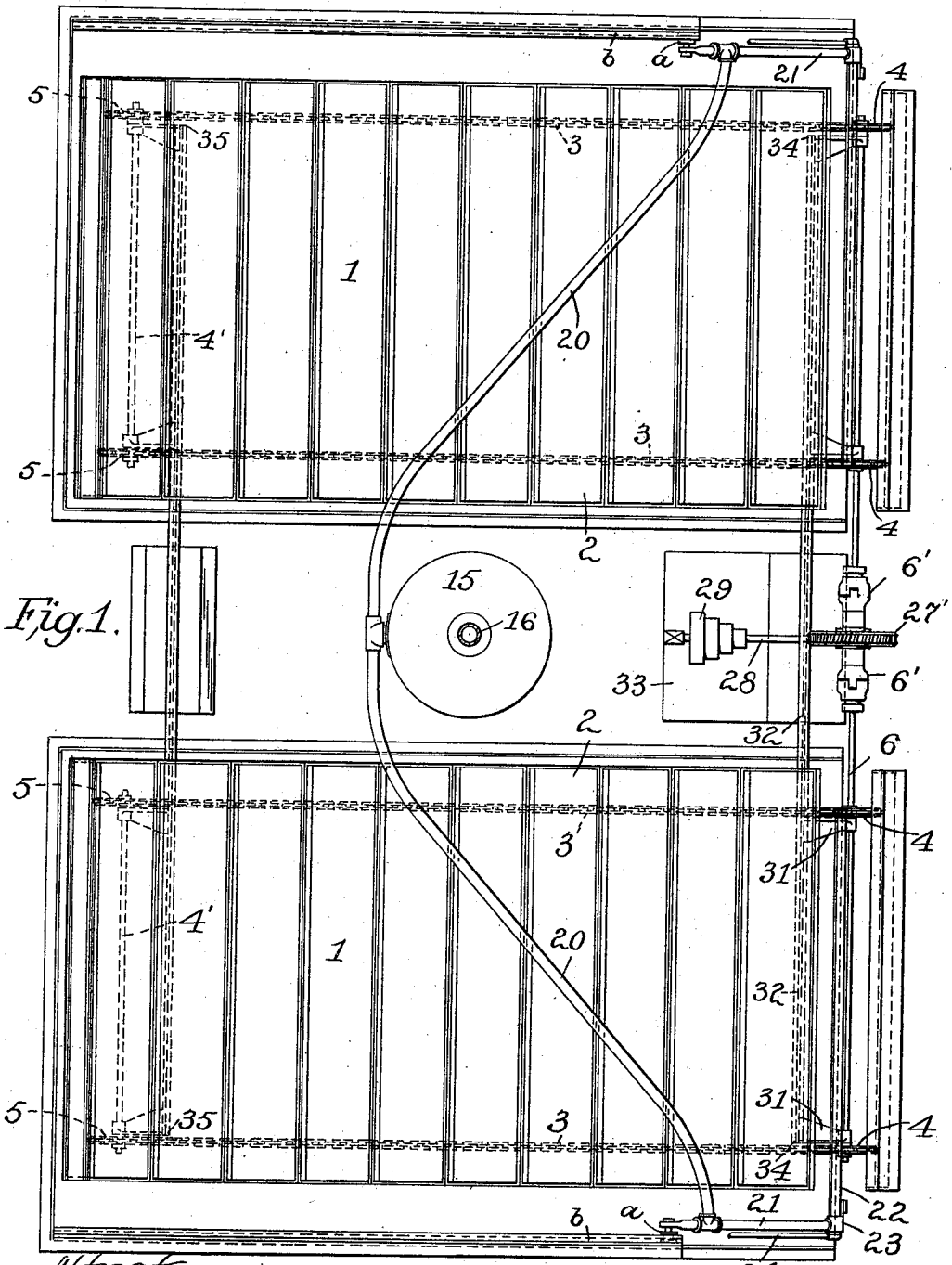

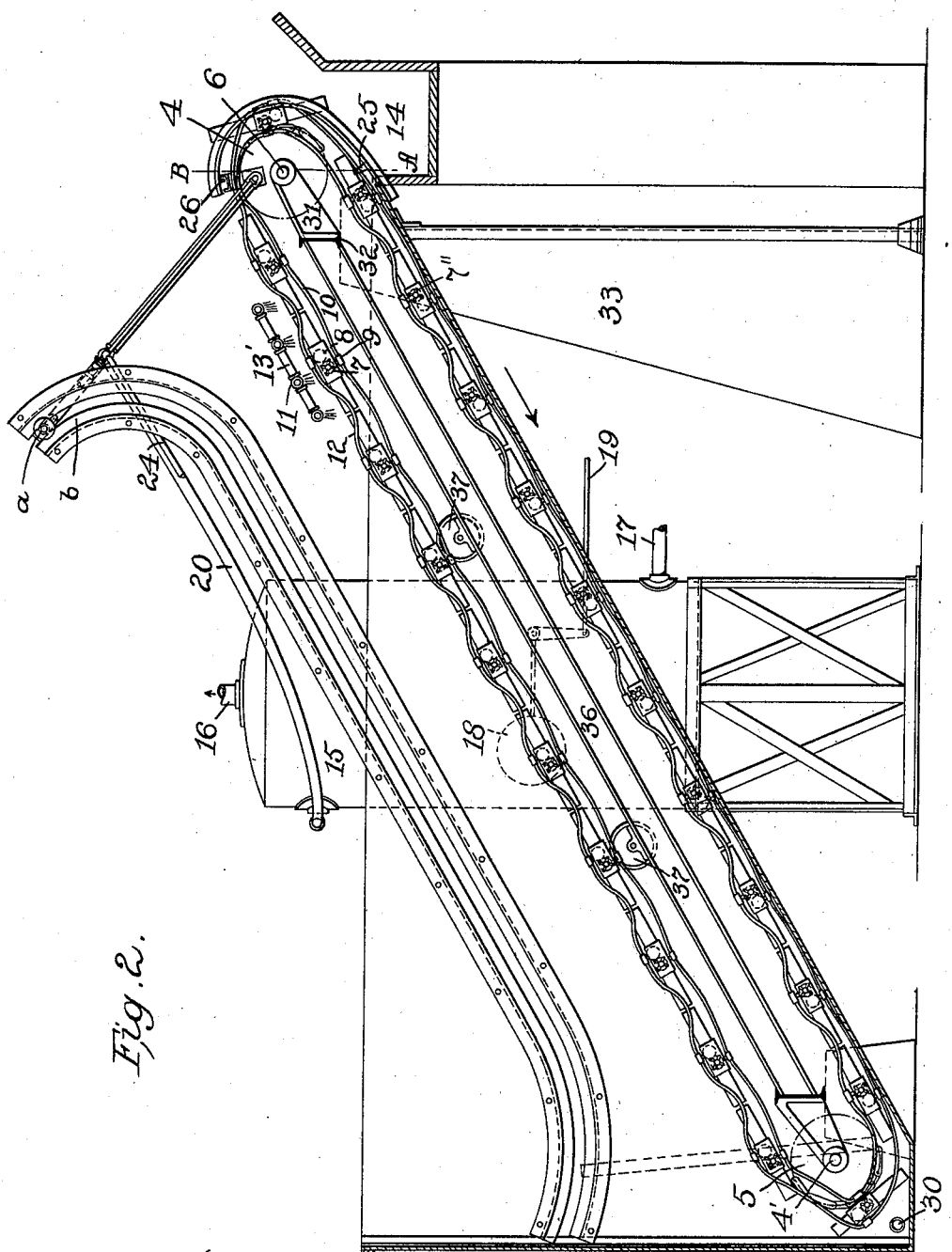

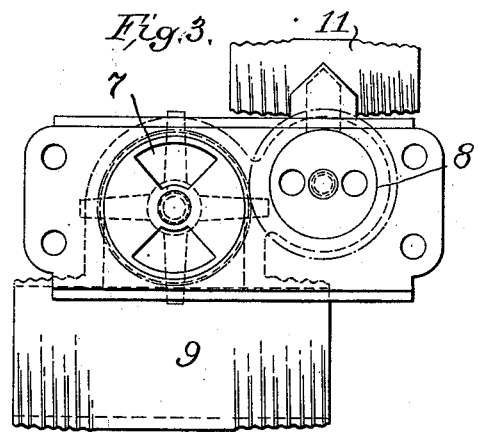
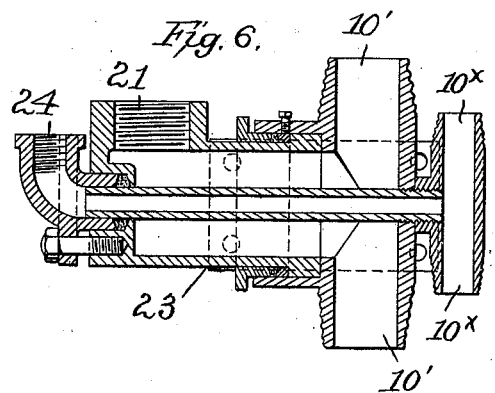
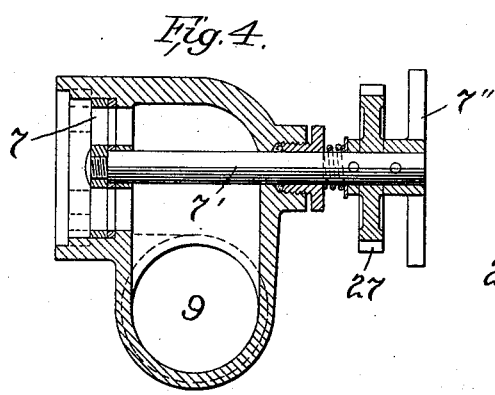
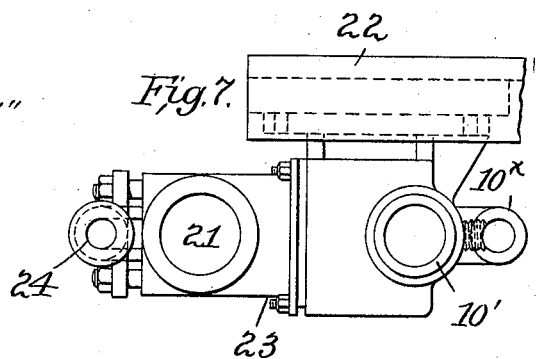
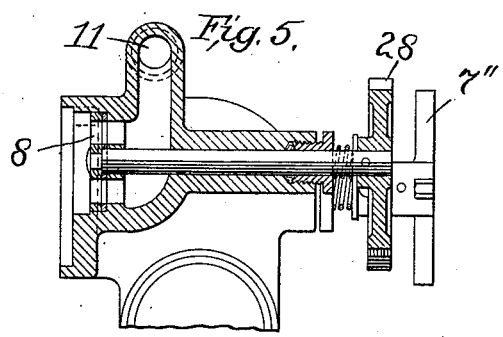
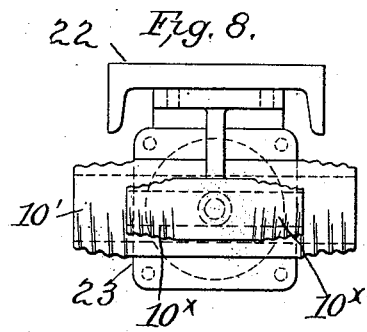

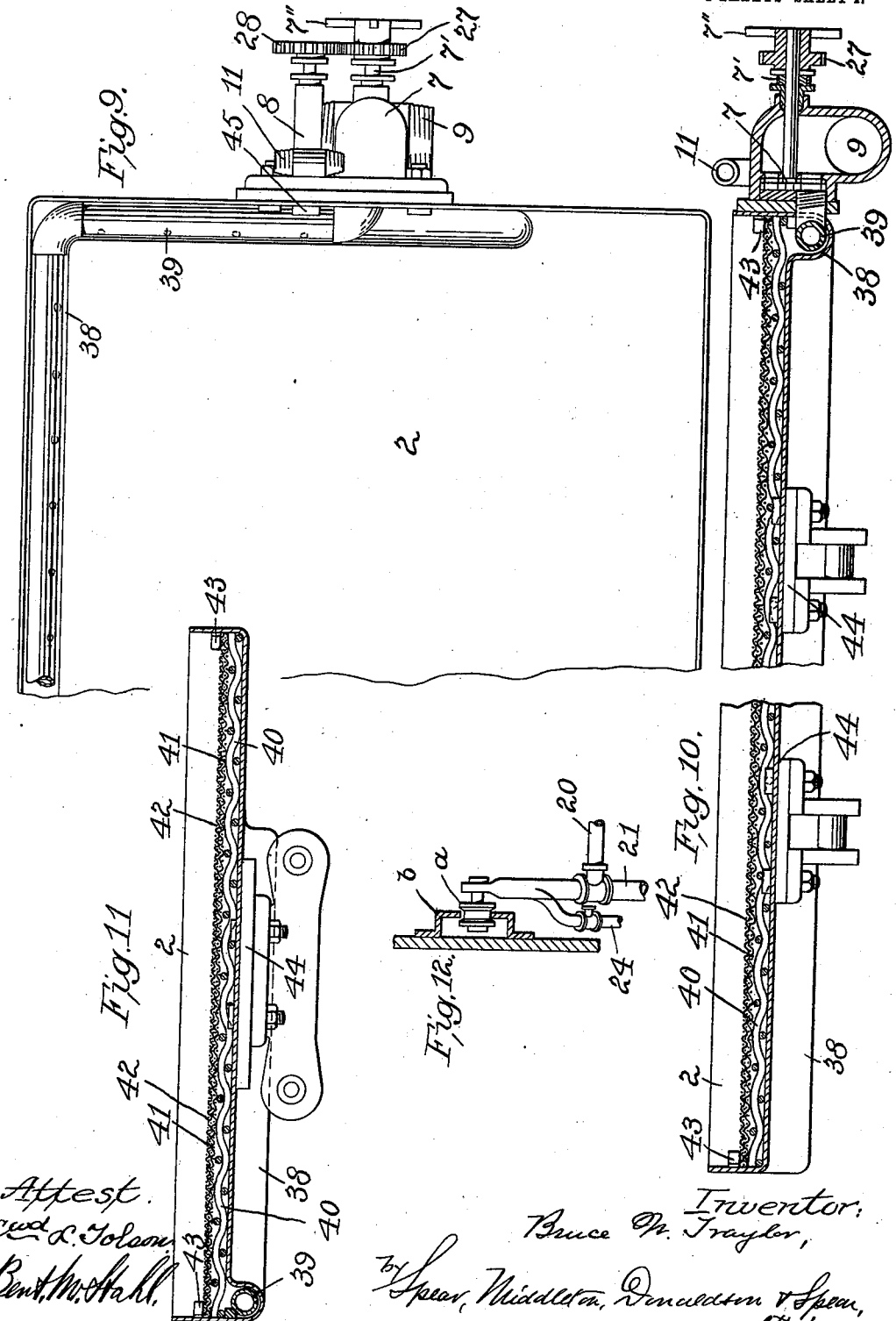

BRUCE W. TRAYLOR, OF NEW YORK, N. Y.

CONTINUOUS FILTER.

1,000,856.

Specification of Letters Patent. Patented Aug. 15, 1911.

Application filed April 19, 1910. Serial No. 556,430.

*To all whom it may concern:*

Be it known that I, BRUCE W. TRAYLOR, citizen of the United States, residing at New York, N. Y., have invented certain new and useful Improvements in Continuous Filters, of which the following is a specification.

My invention relates to continuous filters for separating the valuable material from pulp or slimes, and it consists in the features of construction and combination and arrangement of parts hereinafter described and particularly pointed out in the appended claims.

In the accompanying drawings Figure 1 is a plan view of a portion of the apparatus; Fig. 2 is a sectional view with parts in section; Figs. 3, 4 and 5 are detail views of the air and vacuum valve; Fig. 6 is a sectional view of the swivel joint coupling for the air and vacuum pipes; and Figs. 7 and 8 are detail views of this coupling. Figs. 9–11 are views of details. Fig. 12 is a detail view of the trolley connection.

The apparatus comprises a pair of tanks, one of which is shown at 1, in each of which a chain of filtering pans 2 is mounted, these pans being of elongated form, and being carried by sprocket chains 3 passing over sprocket wheels 4 and 5, the sprocket wheels 4 being mounted on a shaft 6 outside of and slightly above the tank, while the shaft 4' is located at the lower part of the tank and at the end opposite that at which the upper shaft is located, so that the pans are carried through the tank on an inclined course, and are moved above the tank as they pass around the upper sprocket wheels. The filter or vacuum pans have therein coarse wire cloth covered with cocoa matting, and on top of this matting is the filter cloth. Each pan has a vacuum connection, and also an air pressure connection, these connections being shown in Figs. 3, 4 and 5, in which the valve 7 controls the vacuum, and the valve 8 the air pressure. The chamber of the valve 7 is connected through the coupling 9 with the vacuum pipe 10, which leads from one vacuum pan to the other throughout the whole circuit of the chain, and the chamber of the air pressure valve 8 is connected through the T-coupling 11 with the air pressure pipe 12 which also extends from pan to pan throughout the whole circuit of the tank, so that all of the vacuum pans may be connected with the air pressure supply when they reach certain points in their travel.

The point at which the pans are connected with the vacuum supply and where the air pressure supply closes, is indicated at A in Fig. 2, and the point at which connection with the vacuum supply is cut off and the air pressure is turned on is indicated at B in Fig. 2. Each vacuum pan is subjected to the vacuum as it passes down through the pulp and the ore contained in the tank 1 in the direction of the arrow shown in Fig. 1, and this suction is kept up on each pan until it makes a complete circuit, and passes the spray pipes shown at 13' arranged above the tank, and at which point the pans have been lifted from the solution. As the pans travel around through the tank of solution and pulp, a cake is formed on each pan of the desired thickness of the material, which thickness can be controlled according to the speed of the machine, and through the will of the operator. After the vacuum pan has passed the spray pipe and has arrived at the point B, the suction is cut off, and the air pressure valve is opened so that the cake which has been formed in the pan is blown off from the filtering material, and is discharged into the tailings launder 14, thus freeing the pan from all pulp and making the same ready for another action as it passes again into the solution contained in the tank. The spray pipe 13' conveys a wash water or weak solution to the pans and to the cake as contained therein, so as to wash any gold or silver contents out of the slime or cake that may be left there after the pans emerge from the tank.

The vacuum tank is indicated at 15, and lies between the two sections of the apparatus. This tank is connected with a dry vacuum pump to take care of any air that is taken in after the pans are out of the solution, the connection for which is shown at 16, and this goes to the vacuum pump. A connection 17 leads from the vacuum tank to a wet vacuum pump. This latter is controlled by a float 18 arranged within the tank having a connection 19 leading to the throttle of this pump by which the wet vacuum pump will operate fast or slow, depending on the amount of solution in the vacuum tank 15. From this vacuum tank a hose 20 extends to a pipe 21, which, in turn, connects with a coupling 23 mounted on a channel iron 22 extending transversely of the chain of pans, and carried by the sprocket chains, and from this coupling connection is made with the vacuum pipe 10 before described at 10'. The connection at 23 is a swiveled one, and this swivel connection also receives the air pressure supply pipe 24.

There is a continuous suction or vacuum on the hose 20 and pipe 21, and this suction to the several vacuum pans is controlled through the valves 7 above mentioned. For this purpose each of the valves 7 has on its stem 7' a star wheel 7'', and when the carrier moves the chain of pans to a certain point, this star wheel will strike a pin, and thus turn the valve to open the vacuum connection, and after the pan leaves the tank and it is desired to discharge the cake therefrom, the star wheel strikes another pin to close the suction connection, these pins being indicated at 25, 26. The stem of the suction or vacuum valve is connected to gearing 27, 28, with the stem of the air pressure valve, so that when one of these suction valves is operated to open or close, its companion air pressure valve will be operated in a reverse manner to close or open.

The apparatus is intended to filter any product, such as cyanid pulp and solution, sugar cane, or any material where solids are to be separated from water or solution of any kind. The pipe 21 is provided with a trolley $a$ at its upper end, and for controlling this trolley a suitable track $b$ is provided composed of two Z-bars. This pipe travels back and forth as the chain of filtering pans revolves. The pipe 20 also, of course, follows the traveling movement of the chain of filter pans, being connected therewith in any suitable manner as by the pipe 21 as above described.

The apparatus is driven through the shaft 6 having a jaw clutch at 6' connecting with a worm wheel at 27', which is driven from a shaft 28 through a suitable worm, said shaft being provided with a cone pulley 29 by which the said shaft is driven. Either one side or the other of the machine may be thrown out of operation by means of the jaw clutches at 6' while the driving mechanism is still in motion.

At 30 I show an air inlet pipe at the bottom of the tank to agitate the contents of the tank.

The shafts which support the endless chains are supported by brackets 31 connected with the I-beam 32 supported upon a column 33 arranged intermediate of the tanks, and extending to each side of the said column, and reaching only to the point 34, so that a free way is left at the outer side of the chain of filter pans for the movement of the pipes 21 and 24. The lower shaft is supported upon brackets extending from a lower I-beam which extends to the point 35, and these upper and lower I-beams are connected by a beam 36, and upon this beam rollers 37 are mounted, which afford intermediate bearings for the chain of filters.

Reverting to the pans, these are shown in detail in Figs. 9, 10 and 11. Each pan has a depression 38 which extends along two adjacent sides of the tank, and receives the vacuum pipe 39 which is connected through the vacuum valve 7 with the vacuum hose 10. On the bottom of the pan is placed the wire screen cloth 40, and on the top of this is the cocoa matting 41 upon which is placed a canvas filter cloth 42, all these parts being held down by suitable cleats 43. As shown in Figs. 10 and 11, the pans are connected with the carrying chains by means of plates 44 connected to the bottoms of the pans and to the chain links. The pipe 39 is perforated so that the solution will be drawn from the pan in through these openings, and thence through the vacuum valve 7.

At 45 is shown the air inlet on the side of the pan through which the air pressure is admitted to loosen the cake of slimes in the pan. The swivel joint which forms the connection between the pipes 21 and 24 is shown in Figs. 7 and 8 connected with the channel iron 22, the channel iron being shown in place in these figures. Threaded nipples to connect with the air hose are indicated at $10^x$, and as before stated, 10' indicates the points at which the vacuum hose connects with the swivel coupling.

In the operation of the apparatus, the values which are separated from the slimes as the water is sprayed on the cake of slimes by the spray pipe 13' are, together with the solution and water, drawn from the pan by the suction through the vacuum pipe connection, and are carried into the vacuum tank.

I claim as my invention:—

1. In combination in apparatus of the class described, a tank, a series of filter pans, a flexible endless carrier therefor to move them into and out of the solution in the tank, means for directing the pans along an inclined path and turning them upside down at the point of discharge, suction and air pressure connections to the pans, with means for controlling the same for opening the suction connections when the pans are submerged, and for closing the suction connections and opening the air pressure connections after the pans emerge from the solution, the air pressure being directed to discharge the material from the pans, substantially as described.

2. In combination a tank, filter pans with means including a flexible endless carrier therefor and wheels about which the same passes to submerge the pans and withdraw them from the tank and for turning them upside down at their point of discharge as they pass about one of the wheels, a flexible suction connection and a flexible pressure connection leading to the filter pans, and means for controlling the passage through the flexible connections, substantially as described.

3. In combination with a tank, a filter member to be submerged and withdrawn from said tank, a suction connection and an air pressure connection to said member, a suction valve and an air pressure valve controlling said connections, said valves being connected together to move in unison, and means for operating one of the said valves at certain points in the movement of the filter member, substantially as described.

4. In combination a tank, a support at one side of the tank having a laterally extending supporting member, an endless carrier in the tank, filter members on the carrier, suction and air pressure connections to the filter members, including a traveling connection moving with the carrier, a flexible connection leading thereto, and a guide member for controlling the traveling connection, substantially as described.

5. In combination, a tank, a traveling series of flexibly connected filter pans with suction and air pressure connections to the pans and a supporting wheel at each end of the course of the filter pans for directing them through the tank, substantially as described.

6. In combination a tank, filter pans with means for moving them through the tank and for projecting them beyond the tank at one point, said means including a flexible carrier, upper and lower supporting and directing wheels, a suction and pressure means connected with the pans, said suction means acting when the pans are within the tank, and said pressure means acting when the pans are projected beyond the tank, substantially as described.

7. In combination, a tank, flexibly connected filter pans, a lower wheel and an upper wheel for directing the pans through the tank and for projecting them beyond the tank and turning them upside down at their point of discharge as they pass about the upper wheel, and suction and pressure means connected with the pans, substantially as described.

8. In combination a tank having an inclined bottom, flexibly connected filter pans movable along the inclined bottom of said tank and beyond the wall thereof, wheels one within and one beyond the tank for directing the filter pans through the tank and for turning them upside down at their point of discharge as they pass about one of the wheels, and air suction and air pressure means for collecting the material in the pans and for then discharging the same therefrom when the pans are turned upside down, substantially as described.

9. In combination, a tank, a series of filter pans, a flexible endless carrier therefor moving in an elliptical path and turning the pans upside down at one end of the said path, and air suction and air pressure means, substantially as described.

10. In combination, a tank, flexibly connected filter pans, suction and air pressure means connected with the pans and wheels disposed at separated points for directing the flexibly connected filter pans through the tank and for turning them upside down at their point of discharge as they pass about one of the wheels, substantially as described.

11. In combination, in apparatus of the class described, a series of flexibly connected pans, a directing wheel at each end of the course of the said pans, flexible suction and flexible pressure connections, a source of supply for the pans from which they receive the material to be filtered, and valves controlling the air pressure and suction connections, the suction connection being cut off and the air pressure turned on as the pans pass around one of the directing wheels at the point of discharge, substantially as described.

12. In combination, a bath, a series of flexibly connected pans, a directing wheel within the bath, a directing wheel at the point of discharge outside the bath, flexible air pressure and flexible suction connections moving with the pans, valves controlling said connections and means for operating the valves to cut off the suction and apply the air pressure as the pans are passing over the directing wheel at the discharge point, and means for turning on the suction while the pans are passing through the bath, substantially as described.

13. In combination with a tank, a series of flexibly connected filter pans, suction and pressure connections thereto, wheels for directing the flexibly connected pans through the tank, a track and connections controlled by the said track and leading to the flexible suction and pressure connections to supply them with pressure or to exhaust the pressure therefrom, substantially as described.

In testimony whereof, I affix my signature in presence of two witnesses.

BRUCE W. TRAYLOR.

Witnesses:
R. R. SHAFTER,
W. J. ROBERTS.

---

Copies of this patent may be obtained for five cents each, by addressing the "Commissioner of Patents, Washington, D. C."